(12) United States Patent
Hu et al.

(10) Patent No.: US 7,965,786 B2
(45) Date of Patent: Jun. 21, 2011

(54) CLEAN SENSING FOR DYNAMIC FREQUENCY HOPPING IN DYNAMIC SPECTRUM ACCESS NETWORKS

(75) Inventors: Wendong Hu, San Jose, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 707 days.

(21) Appl. No.: 12/035,380

(22) Filed: Feb. 21, 2008

(65) Prior Publication Data

US 2008/0205487 A1    Aug. 28, 2008

Related U.S. Application Data

(60) Provisional application No. 60/891,122, filed on Feb. 22, 2007.

(51) Int. Cl.
  *H04B 7/02* (2006.01)
  *H04L 1/02* (2006.01)

(52) U.S. Cl. .................... 375/267; 375/132

(58) Field of Classification Search .......... 375/132, 375/260, 267
  See application file for complete search history.

(56) References Cited

U.S. PATENT DOCUMENTS

| | | | | | |
|---|---|---|---|---|---|
| 5,862,142 | A | * | 1/1999 | Takiyasu et al. | 370/480 |
| 2007/0223419 | A1 | * | 9/2007 | Ji et al. | 370/329 |

OTHER PUBLICATIONS

Dynamic Frequency Hopping Community, IEEE 802.22-06/0113r0, Jun. 2006, pp. 1-61.*

* cited by examiner

*Primary Examiner* — Chieh M. Fan
*Assistant Examiner* — Freshteh N Aghdam
(74) *Attorney, Agent, or Firm* — Lisa K. Jorgenson; William J. Kubida

(57) ABSTRACT

Clean and reliable channel sensing during dynamic frequency hopping over a plurality of overlapping wireless regional area network (WRAN) cells is conducted using a minimum number of channels. By coordinating a phase-shift of the operation periods of each WRAN cell over a minimum number of working channels, interruption-free communication and data transmission for each of the WRAN cells as well as interference-free channel sensing can be achieved.

19 Claims, 2 Drawing Sheets

CLEAN SENSING FOR DYNAMIC FREQUENCY HOPPING IN DYNAMIC SPECTRUM ACCESS NETWORKS

RELATED APPLICATION

The present application claims the benefit of U.S. Provisional Patent Application No. 60/891,122 filed Feb. 22, 2007, which is hereby incorporated in its entirety by reference for all purposes as if fully set forth herein.

BACKGROUND OF THE INVENTION

1. Field of the Invention

Embodiments of the present invention relate, in general, to systems and methods for frequency use and allocation in a wireless network and particularly to reliable channel sensing in wireless regional area network cells employing dynamic frequency hopping.

2. Relevant Background

Cognitive radio is considered to be an enabling technology that allows unlicensed radio transmitters to operate in licensed bands at locations where that spectrum is temporally not in use. Based on cognitive radio technology, IEEE 802.22 is an emerging standard for wireless regional area networks (WRANs) operating on a license-exempt and non-interference basis in the spectrum allocated to TV broadcast services (between 47-910 MHz). This standard aims at providing alternative broadband wireless Internet access in areas without creating harmful interference to licensed TV broadcasting.

A WRAN cell consists of a Base Station (BS) and the associated Customer Premise Equipments (CPEs) that communicate to the BS via a fixed point-to-multi-point radio air interface. The typical radius of the coverage area is on the order of 33 km. WRAN operations need to satisfy two apparently conflicting requirements: (1) assure the Quality of Service ("QoS") satisfaction for WRAN services, and (2) at the same time, provide reliable and timely spectrum sensing for guaranteeing the licensed user protection.

Dynamic Frequency Hopping ("DFH") is a technique that incorporates non-traditional dynamic channel allocation with slow frequency hopping. The main objective in DFH is to provide capacity improvements through the addition of interference avoidance that are higher than those provided by conventional frequency hopping while preserving interference averaging characteristics of conventional frequency hopping in order to provide robustness to rapid changes in interference.

Generally, the key concept behind this intelligent type of frequency hopping is to adjust or create frequency hopping patterns based on interference measurements. DFH uses slow frequency hopping and adaptively modifies the utilized frequency hopping pattern based on rapid frequency quality measurements, also referred to as QoS measurements. This technique combines traditional frequency hopping with dynamic channel allocation, where a channel is one frequency in a frequency hop pattern. The continuous modification of frequency hop patterns is based on measurements representing an application of dynamic channel allocation to slow frequency hopping. Modifications are based on rapid interference measurements and calculations of the quality of frequencies used in a system by all CPEs and BSs. The target of these modifications is tracking the dynamic behavior of the channel quality as well as of interference.

Current sensing requirements state that incumbent signals shall be detected by WRAN devices with no more than a 2 second delay. Within IEEE 802.22, the sensing mechanism is designed to offer protection to two types of incumbents, namely, the TV service and wireless microphones. Analyses of well-known sensing technologies show that the sensing task takes up to several tens of milliseconds per channel, given the required reliability. For example, the Digital Television ("DTV") energy detection at 6 MHz requires 69.43 ms per channel. In fact, because of out-of band interference, a channel can be considered to be free only if its adjacent channels are also free, making it necessary to sense several channels. Hence, a sensing period can range from tens of milliseconds up to more than 100 milliseconds. Incumbent signals (DTV and the like) must be detected by WRAN devices starting from the time the licensed signal exceeds the detection threshold on a TV channel. Thus a WRAN cell must perform sensing on a working channel at least every 2 seconds. Unfortunately a channel that is to be sensed cannot be used for data transmission, thus a cell operating consistently on a single channel must interrupt data every 2 seconds for sensing. Such a non-hopping mode leads to periodic interruptions and can significantly decrease system throughput and impair QoS. The solution to this problem, as will be appreciated by one skilled in the art, is DFH.

As previously described, DFH differs from conventional frequency hopping in the way the patterns are built. Instead of using random or pre-defined repetitive hopping patterns, DFH patterns are dynamically generated for active users. In this manner, the hopping patterns can be adjusted to adapt to interference changes. The basic idea behind creating the patterns is to choose the best frequency for each hop. This best frequency corresponds to the frequency that is interfered with the least. DFH thus requires continuous estimation and measurement (sensing) of the interference at every frequency for every single hop of a pattern.

Spectrum sensing of this type takes time away from periods that could otherwise be used for data communication. Hence sensing can compromise the system's QoS. It is thus critical to analyze and understand the interplay of sensing and spectrum management and how best to optimize them for different situations that may occur during DFH.

SUMMARY OF THE INVENTION

A method and system for clean and reliable channel sensing for a plurality of overlapping WRAN cells employing DFH is described by virtue of the following embodiments. In a system that includes a plurality of overlapping WRAN cells, a minimum number of working channels is selected so as to ensure interruption-free communication and data transmission for each of the WRAN cells as well as interference-free channel sensing.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention, a plurality of overlapping WRAN cells operate using DFH. To ensure that each WRAN cell is capable of interruption-free communication and data transmission as well as being able to comply with the sensing requirements, a minimum number of channels is selected equal to the maximum number of overlapping WRAN cells plus the number 1. Each WRAN cell is associated with an operation period that is split among the channels being used for DFH. The minimum length of any one operation period is, according to one embodiment of the present invention, set to equal the product of the length of the quiet time (QT) period and the maximum number of overlapping cells. The length of the QT period is set so as to meet minimum sensing requirements for channel sensing for a given sensing technology.

To ensure interruption-free communications and data transmissions for each WRAN cells the operation period for each WRAN cell is shifted by one or more QT periods as compared to the other WRAN cells participating in DFH. According to one embodiment of the present invention, a first WRAN cell shifts its operation period one QT period as measured against the operation period of a second WRAN cell. In this manners each WRAN cell of the plurality of overlapping WRAN cells stagger their operation periods by an integer multiple of the QT period.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
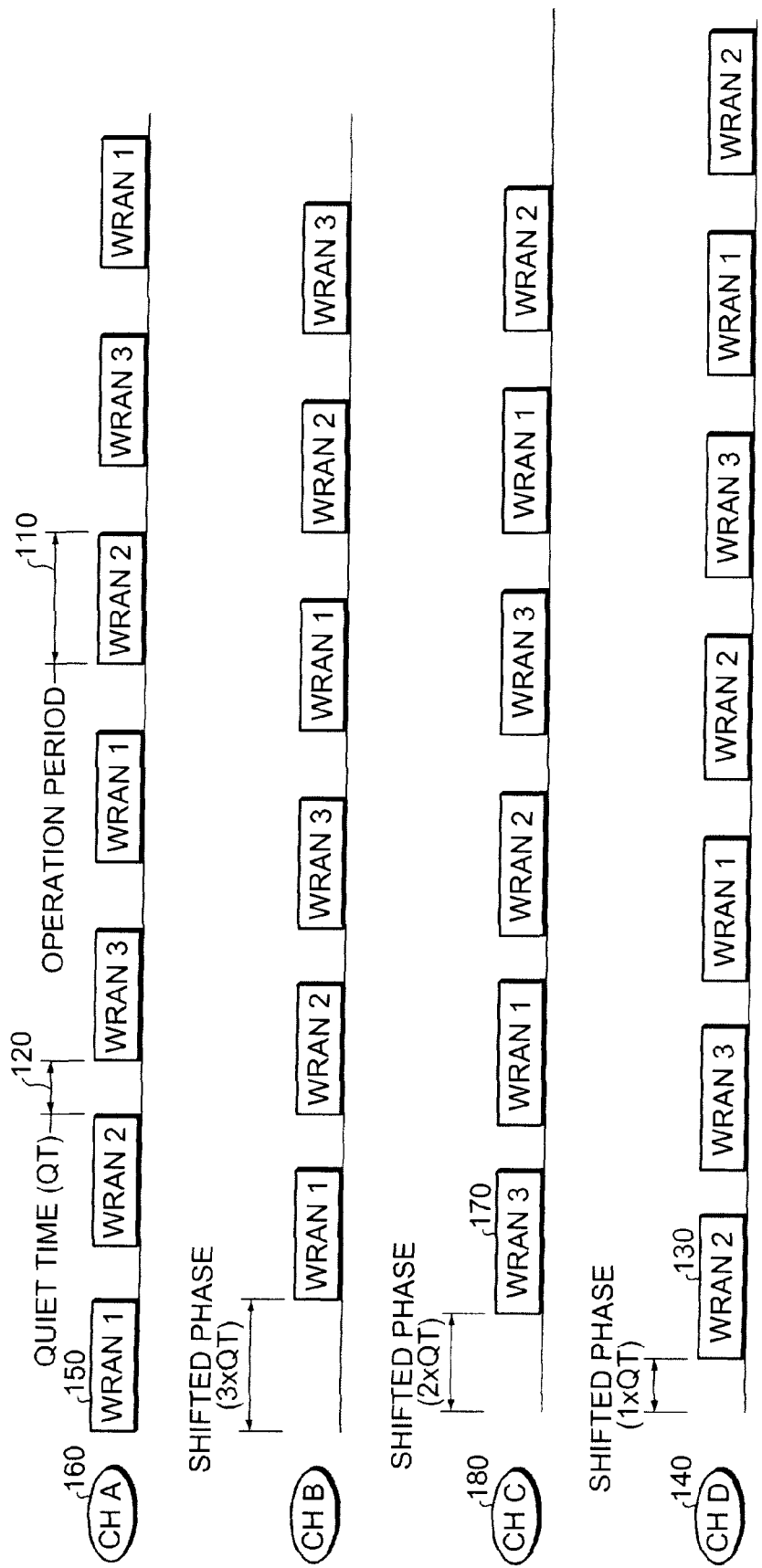
FIG. 1 shows one embodiment of a phase-shifting DFH operation for a plurality of overlapping WRAN cells according to the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Methods and systems for clean sensing in WRAN cells employing DFH are disclosed hereafter. Embodiments of the present invention depicted herein describe a DFH operational mode that enables clean channel sensing during WRAN DFH operations. According to one embodiment of the present invention, a minimum number of channels is determined based on the number of overlapping WRAN cells. Using this information, a phase-shifted DFH operation can be conducted based on a QT period. The QT period must be larger than the minimum sensing time for the required number of channels given the sensing technology in use.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

In order to perform reliable sensing in a WRAN cell employing DFH, the channel being sensed cannot be used for data transmissions. This implies that a single WRAN cell needs at least two channels in order to perform data transmission and reliable sensing in parallel. By extension, a total of 2N channels would be needed to support N overlapping or interfering WRAN cells where N is the total number of WRAN cells. In this case, the 2N number of channels could support totally uncoordinated, mutually interfering cells without fear of collisions in channel usage among the overlapping cells. While this approach provides for a collision-free environment, it is an inefficient use of available channels.

According to one embodiment of the present invention only N+1 vacant channels (i.e., channels free of both incumbents and other WRANs) are needed under certain conditions to ensure overlapping or otherwise interfering WRAN cells can operate at the same time without collisions. FIG. 1 illustrates the phase-shifting DFH operation of three, N=3, overlapping WRAN cells over four, (N+1)=4, vacant channels. Each WRAN cell shifts its DFH operation phase 110 by one QT 120 against the operation phase of the previous WRAN cell as shown in FIG. 1. For instance, WRAN2 130 on channel D 140 shifts its operation by one QT 120 against the operation of WRAN1 150 on channel A 160, and WRAN3 170 on channel C 180 shifts by one QT 120 against that of WRAN2 130 on channel D 140. During a QT 120, channel sensing is performed. This implies that a QT 120 must be at least equal to the minimum time required for reliable channel sensing.

Thus a set of N overlapping cells can operate (hop) continuously using N+1 channels (Channels A, B, C, and D in the example presented in FIG. 1) as long as the length of a single transmission is larger than the product N*QT. At each hopping instant, the BS or the CPE must measure the QoS of each frequency, filter the measurement to average out the instantaneous Rayleigh fading effects, and then send the data using the 'best' frequency chosen according to some quality selection criteria. Typically the hopping patterns for users within the same cell are orthogonal. The performance of an established link is monitored, and upon the performance dropping below a given threshold, a better hopping pattern is generated.

In preferred embodiments, the present invention is implemented as instructions embodied as software that are executed on either BSs and/or CPEs. In basic operation, program logic (including that which implements methodology of the present invention described below) is loaded from a removable storage or fixed storage into a main (RAM) memory, for execution by a CPU.

Software programming code that embodies the present invention may be embodied on any of a variety of known media such as a diskette, hard drive, or CD-ROM. The code may be distributed on such media, or may be distributed from the memory or storage of one computer system over a network of some type to other computer systems for use by such other systems. The techniques and methods for embodying software programming code in memory, on physical media, and/or distributing software code via networks are well known and will not be further discussed herein.

The DFH pattern imposed on N+1 channels using a number of shifted jumps according to one embodiment of the present invention is only possible with strict coordination between each participating cell. The coordination of such a hopping pattern can, in one embodiment of the present invention, be conducted by a group of cells referred to as a DFH Community.

A DFH Community, according to one embodiment of the present invention, is a non-empty set of neighboring WRAN cells following a common protocol that supports a coordinated DFH operation in order to ensure mutual interference-free channel sensing and to minimize the channel usage by applying DFH phase-shifting. A DFH Community typically has one leader and, possibly, some community members. One definition of a DFH Community, as is known to those skilled in the art, is that one-hop BS neighbors create a DFH Community, meaning that each WRAN cell in a community is within one hop of the other members of the cell. A priority value is used to elect the DFH Community leader from those members, and the elected leader decides when and to which channel to hop among the available channel set for each community member. The community members hop among the same available channels according to the leader's decision in a synchronized fashion. Thus the DFH Community leader is responsible for decisions about community membership including calculating and communicating the hopping patterns (phase-shifting sequences) for all members of the Community. Members (other overlapping WRAN cells) provide the leader with channel availability information, i.e. information about their sensing results and observed channel usage of the neighboring WRAN cells. Within the DFH Community, hopping information does not change as long as the community is stable (i.e., no new member arrives or existing member departs). Using this method, hopping collisions can be avoided and real-time inter-BS communication is not necessary.

DFH Community is thus a concept introducing coordination among cells. Certainly other means for coordinating operations among a plurality of overlapping WRAN cells is possible and within the scope of the present invention. For example, intercommunications among BSs under certain protocols may also be sufficient to coordinate DFH operations. The key idea is that neighboring WRAN cells form cooperating communities that choose their hopping channels and perform DFH operation in a coordinated manner thus preventing collisions. Such coordination leads to better QoS and throughput behavior while requiring a modest amount of channels for hopping. Moreover, coordinated channel hopping can give WRAN cells more time to perform channel sensing and increase channel efficiency. DFH Communities are formed on tenet that in order for WRAN cells to overlap, channels of communication must be shared and this sharing must be coordinated. DFH Communities are therefore formed with the understanding that each community has a hopping pattern and that each community should use as small a number as possible of working channels. Since each WRAN must include a QT period for sensing, the combination of the QT period with the working period must be able to satisfy incumbent user requirements.

Figure 2:
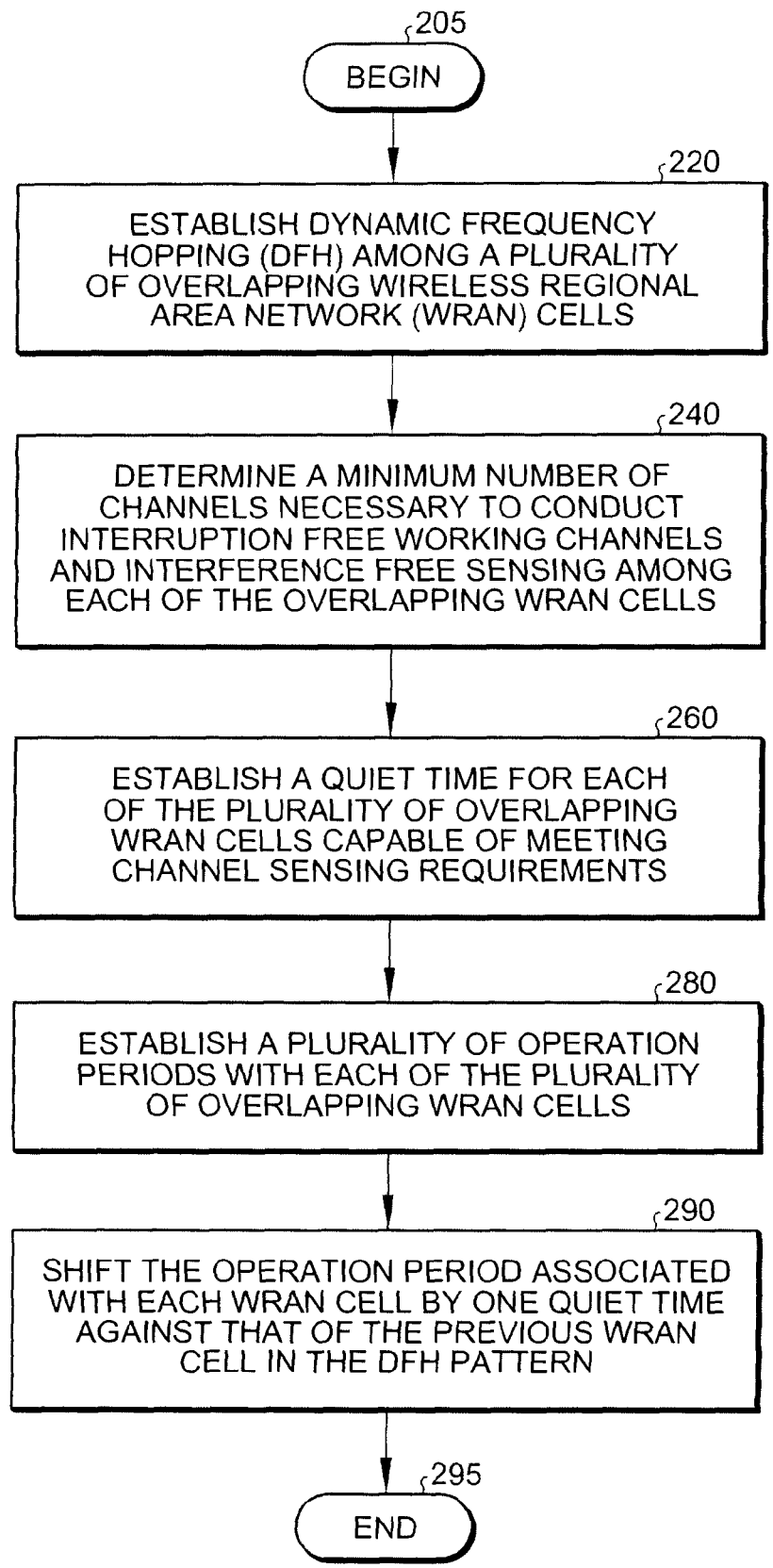
FIG. 2 shows a flowchart of one method embodiment for establishing clean channel sensing in WRAN cells employing DFH according to the present invention.

FIG. 2 shows a flowchart of one method embodiment for establishing clean channel sensing in WRAN cells employing DFH according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one embodiment of the present invention, a plurality of overlapping WRAN cells can operate on a minimum number of channels equal to the maximum number of overlapping WRAN cells (N) plus the number 1. This value, N+1, is based on the assumption that the operation period for each WRAN cell, operating on each channel, is larger than the product of the number of overlapping cells (N) and the QT period. Said another way, the operation period of each WRAN cell$\geq$N*QT.

This also implies that the QT between each of the operation periods is sufficient for reliable channel sensing. According to one embodiment of the present invention, the QT period interposed between each operation period is larger than the minimum sensing time for the required number of channels, (N+1), for the sensing technology in use.

The process shown in FIG. 2 begins 205 with the establishment 220 of DFH operations among a plurality of overlapping WRAN cells. According to the present invention, a minimum number of channels is determined 240 necessary to conduct interruption-free communications and data transmission for each of the overlapping WRAN cells as well as interference-free channel sensing during the QT periods.

The length of the QT periods is established 260 so as to be larger than the minimum sensing time for the minimum number of channels given the sensing technology. In conjunction with the determination of the minimum number of channels for DFH and that of the length of the QT period is the establishment 260 of a plurality of operation periods for each of the plurality of overlapping WRAN cells. As will be appreciated by one skilled the art, DFH splits a single transmission amongst a number of channels.

According to the present invention, N number of WRAN cells can conduct DFH without fear of any interruption of transmission using N+1 channels. To do so, the operation periods associated with each of these channels must be offset or shifted 290 by an integer multiple of the QT. Therefore each WRAN cell will shift its operation period one QT with respect to the operation period of the previous cell. This staggered/phase-shifted approach to operation periods distributed over N+1 channels not only ensures interruption-free transmissions of data but interference-free channel sensing.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with clean channel sensing during DFH operations amongst a plurality of overlapping WRAN cells, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for dynamic frequency hopping ("DFH") among a plurality of overlapping wireless regional area network ("WRAN") cells wherein each WRAN cell includes a base station ("BS") and a plurality of consumer premise equipments ("CPEs") associated with the BS, the system comprising:
   a number of channels for communicating between each of the CPEs and BS of the plurality of WRAN cells wherein the number of channels is equal to a maximum number of the plurality of overlapping WRAN cells plus 1; and
   a hopping pattern that hops over the number of channels providing interruption-free working channels and mutual interference-free sensing among each of the plurality of overlapping WRAN cells,
   wherein a length of each of a plurality of operation periods associated with each of the plurality of overlapping WRAN cells is set to a value greater than a product of a maximum number of overlapping WRAN cells and a quiet period.

2. The system of claim 1 wherein at least one of the plurality of overlapping WRAN cells coordinates the hopping pattern for the plurality of overlapping WRAN cells.

3. The system of claim 1 wherein the hopping pattern includes a plurality of operation periods associated with each of the plurality of overlapping WRAN cells operating on each of the minimum number of channels and a quiet time between each of the plurality of operation periods.

4. The system of claim 3 wherein each WRAN cell of the plurality of overlapping WRAN cells shifts its plurality of associated operation periods by one quiet time as measured from a previous WRAN cell operation period.

5. A method for dynamic frequency hopping ("DFH") among a plurality of overlapping wireless regional area network ("WRAN") cells wherein each WRAN cell includes a base station ("BS") and a plurality of consumer premise equipments ("CPEs") associated with the BS, the method comprising:
   determining a minimum number of channels for communicating between each of the CPEs and BS of the plurality of overlapping WRAN cells; and
   setting a channel hopping pattern wherein the channel hopping pattern hops over the minimum number of channels providing interruption-free working channels and mutual interference-free sensing among each of the plurality of overlapping WRAN cells,
   setting a length of each of a plurality of operation periods associated with each of the plurality of overlapping WRAN cells to a value greater than a product of a maximum number of overlapping WRAN cells and a quiet period.

6. The method of claim 5 wherein the minimum number of channels for communicating between each of the CPEs and BS of the plurality of overlapping WRAN cells is equal to a maximum number of overlapping WRAN cells plus 1.

7. The method of claim 6 further comprising receiving a request from an additional WRAN cell to join the plurality of overlapping WRAN cells.

8. The method of claim 7 further comprising determining whether a set of usable channels formed from channels associated with the additional WRAN cell and channels associated with the plurality of overlapping WRAN cells are greater than or equal to the minimum number of channels required by the combination of the plurality of overlapping WRAN cells and the additional WRAN cell.

9. The method of claim 8 further comprising rejecting the request responsive to the set of usable channels being less than the minimum number of channels required by the combination of the plurality of overlapping WRAN cells and the additional WRAN cell.

10. The method of claim 8 further comprising accepting the request responsive to the set of usable channels being greater than or equal to the minimum number of channels required by the combination of the plurality of overlapping WRAN cells and the additional WRAN cell.

11. The method of claim 5 wherein the channel hopping pattern includes a plurality of operation periods associated with each of the plurality of overlapping WRAN cells operating on each of the minimum number of channels and a quiet time between each of the plurality of operation periods.

12. The method of claim 11 wherein each WRAN cell of the plurality of overlapping WRAN cells shifts its plurality of associated operation periods by one quiet time as measured from a previous WRAN cell operation period.

13. A system for dynamic frequency hopping ("DFH") among a plurality of overlapping wireless regional area network ("WRAN") cells, the system comprising:
   a minimum number of channels for use by the plurality of overlapping WRAN cells; and
   a channel hopping pattern wherein the channel hopping pattern hops over the minimum number of channels providing interruption-free working channels and mutual interference-free sensing among each of the plurality of overlapping WRAN cells wherein the channel hopping pattern includes a plurality of operation periods associated with each of the plurality of overlapping WRAN cells operating on each of the minimum number of channels and a quiet time between each of the plurality of operation periods, wherein a length of each of the plurality of operation periods associated with each of the plurality of overlapping WRAN cells is set to a value greater than a product of a maximum number of overlapping WRAN cells and the quiet time.

14. The system of claim 13 wherein each WRAN cell of the plurality of overlapping WRAN cells shifts its plurality of associated operation periods by one quiet time as measured from a previous WRAN cell operation period.

15. The system of claim 14 wherein each of the overlapping WRAN cells coordinates shifting of its plurality of associated operation periods with each other of the overlapping WRAN cells.

16. The system of claim 13 wherein the quiet time is at least equal to a minimum time for channel sensing.

17. The system of claim 13 wherein the minimum number of channels for use by the plurality of overlapping WRAN cells is equal to a maximum number of overlapping WRAN cells plus 1.

18. A base station ("BS") in communication with a plurality of consumer premise equipments ("CPEs") using dynamic frequency hopping ("DFH") forming a first wireless regional area network ("WRAN") cell in a plurality of overlapping WRAN cells, said BS comprising:

a memory capable of storing instructions embodied as software;

a machine capable of executing instructions embodied as software configured to:

establish a channel hopping pattern among a minimum number of channels associated with the plurality of overlapping WRAN cells wherein the channel hopping pattern hopping over the minimum number of channels provides interruption-free working channels and mutual interference-free sensing among each of the plurality of overlapping WRAN cells;

establish a plurality of operation periods associated with each of the plurality of overlapping WRAN cells operating on each of the minimum number of channels and a quiet time between each of the plurality of operation periods;

shift its plurality of associated operation periods by one quiet time at least equal to a minimum time for channel sensing as measured from a previous WRAN cell operation period;

coordinate shifting of its plurality of associated operation periods with each other of the overlapping WRAN cells; and set a length of each of the plurality of operation periods associated with each of the plurality of overlapping WRAN cells to a value greater than a product of a maximum number of overlapping WRAN cells and the quiet period.

19. The BS of claim 18 wherein the minimum number of channels is equal to the maximum number of overlapping WRAN cells plus 1.

* * * * *